United States Patent
Raterman et al.

(10) Patent No.: US 7,216,777 B2
(45) Date of Patent: May 15, 2007

(54) LIQUID DISPENSING SYSTEM USING COLOR-CODED VISUAL INDICIA

(75) Inventors: John M. Raterman, Atlanta, GA (US); Harold T. Patterson, Jr., Stone Mountain, GA (US); Gregory J. Gabryszewski, Snellville, GA (US)

(73) Assignee: Nordson Corporation, Westlake, OH (US)

( * ) Notice: Subject to any disclaimer, the term of this patent is extended or adjusted under 35 U.S.C. 154(b) by 379 days.

(21) Appl. No.: 10/285,200

(22) Filed: Oct. 31, 2002

(65) Prior Publication Data

US 2004/0084486 A1 May 6, 2004

(51) Int. Cl.
B67D 5/08 (2006.01)
(52) U.S. Cl. .................... 222/23; 222/146.5
(58) Field of Classification Search ............. 222/23, 222/146.5, 189.11, 504, 25, 135
See application file for complete search history.

(56) References Cited

U.S. PATENT DOCUMENTS

| | | | | |
|---|---|---|---|---|
| 3,590,739 A | * | 7/1971 | Persson | 102/275.5 |
| 4,039,039 A | * | 8/1977 | Gottfried | 602/13 |
| 4,066,188 A | | 1/1978 | Scholl et al. | 222/146 HE |
| 4,600,124 A | | 7/1986 | Price | 222/54 |
| 4,671,315 A | * | 6/1987 | Gardner | 137/355.12 |
| 5,020,435 A | * | 6/1991 | Cawte | 102/275.1 |
| 5,199,604 A | * | 4/1993 | Palmer et al. | 222/25 |
| 5,277,344 A | | 1/1994 | Jenkins | 222/504 |
| 5,934,520 A | | 8/1999 | Byerly et al. | 222/504 |
| D418,848 S | | 1/2000 | Raterman | D15/144.1 |
| D420,024 S | | 2/2000 | Raterman | D15/144.1 |
| D423,529 S | | 4/2000 | Raterman | D15/144.1 |
| 6,053,212 A | * | 4/2000 | Thomas | 138/129 |
| 6,082,627 A | | 7/2000 | Raterman | 239/1 |
| 6,092,390 A | * | 7/2000 | Griffith, Jr. | 62/468 |
| D433,692 S | | 11/2000 | Fort et al. | D15/144.1 |
| D434,053 S | | 11/2000 | Fort et al. | D15/144.1 |
| D434,784 S | | 12/2000 | Raterman | D15/144.1 |
| 6,322,242 B1 | * | 11/2001 | Lang et al. | 366/163.2 |
| 6,325,297 B1 | * | 12/2001 | Calvin et al. | 237/12.3 B |
| 6,457,608 B1 | * | 10/2002 | Riney | 222/146.5 |
| 6,612,619 B2 | * | 9/2003 | Wieder | 285/23 |
| 6,883,684 B2 | * | 4/2005 | Jeter et al. | 222/146.2 |

OTHER PUBLICATIONS

Nordson Corporation, *Nordson Electro-Pneumatic Solenoid Valves*, 1996 Adhesives and Sealants Equipment Catalog, p. 13-5 (1 page).

* cited by examiner

*Primary Examiner*—Philippe Derakshani
(74) *Attorney, Agent, or Firm*—Wood Herron & Evans, LLP

(57) ABSTRACT

A liquid dispensing system and methods including color-coded visual indicia to assist an operator in the proper selection of the components and in the configuration of those components in the system during setup, maintenance and diagnostics. Color-coded indicia is also provided to assist an operator in the proper selection of a solenoid for use in a particular application. Various components of the liquid dispensing system, such as the melter unit, controller, hoses, electrical cordsets and solenoid, include visually identifiable color-coded indicia on the surfaces of the components, such as color-coded rings, bands and characters, to assist the operator in the component selection and configuration processes.

47 Claims, 3 Drawing Sheets

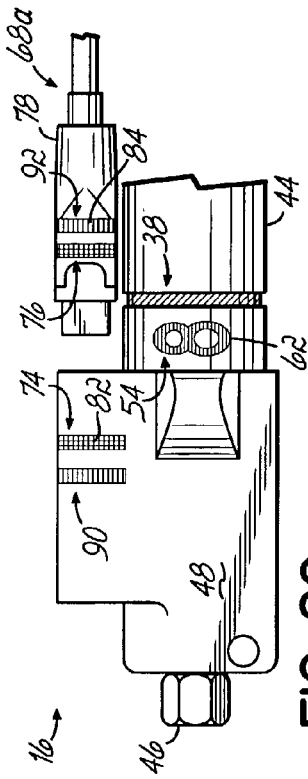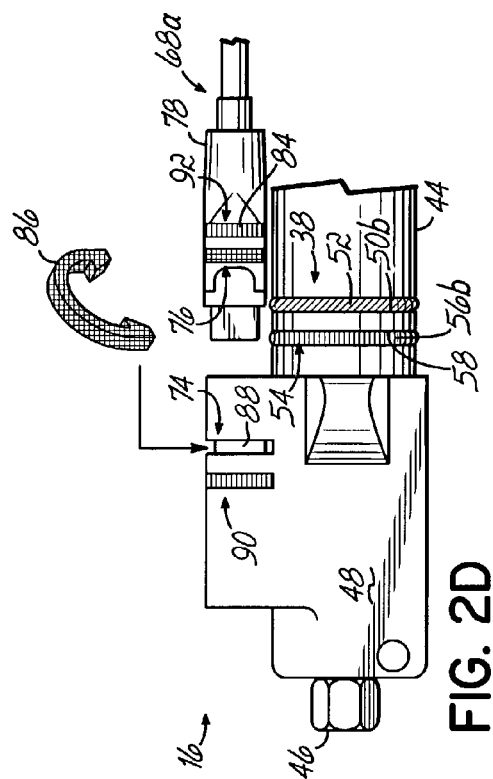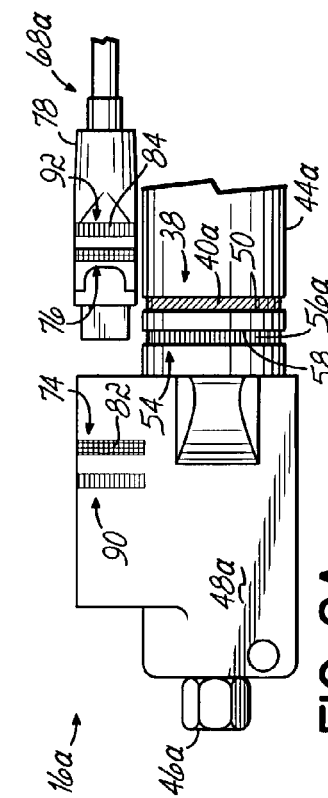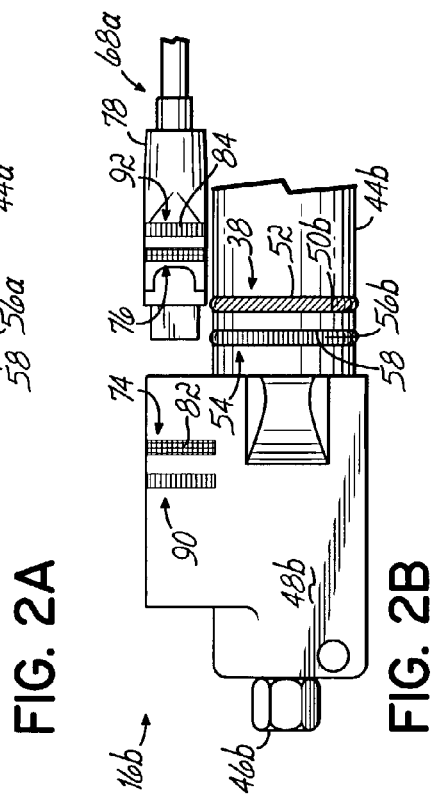
FIG. 2C  FIG. 2D  FIG. 2  FIG. 2A  FIG. 2B

LIQUID DISPENSING SYSTEM USING COLOR-CODED VISUAL INDICIA

CROSS-REFERENCE

The present application is related to U.S. Ser. No. 10/285,199, filed Oct. 31, 2002 and entitled Solenoid Using Color-Coded Visual Indicia in A Liquid Dispensing System.

FIELD OF THE INVENTION

The present invention relates generally to liquid dispensing systems for dispensing liquid materials such as hot melt adhesives, sealants and caulking and, more particularly, to manners of providing visual identification of the components of such liquid dispensing systems.

BACKGROUND OF THE INVENTION

Liquid dispensing systems are used in a variety of industrial applications. For example, in the case of hot melt adhesive dispensing systems, heated liquid adhesive is conveyed through an elongated heated hose from a melter unit having a hot melt supply tank, heated manifold and pump to a remote hot melt dispensing gun. The dispensing gun receives molten hot melt adhesive from the melter unit through the heated hose. In some applications, multiple dispensing guns are connected to a single melter unit through a set of hoses with each hose being connected to a different dispensing gun.

Each dispensing gun and hose, as well as parts of the melter unit, includes a separate heater which must be operated within a predetermined temperature range to provide the proper viscosity for the particular hot melt adhesive used in the dispensing application. To monitor the temperature of the hot melt adhesive throughout the dispensing system, each component includes a temperature sensor which is electrically coupled to a controller of the system. The controller senses the temperature within each component through the respective temperature sensors and operates the heaters within the melter unit, hose and dispensing gun to maintain the hot melt adhesive within the predetermined temperature range.

Dispensing guns in operation, such as those used in packaging or diaper manufacturing lines, are typically located remote from the melter unit. For example, one dispensing gun may be located relatively close to the melter unit (i.e., four (4) feet, for example) while other guns maybe located at various distances from the melter unit (i.e., eight (8), ten (10) and twelve (12) feet, for example). The distance of the guns from the melter unit can cause significant problems when the line is being setup or during diagnostics and maintenance of the dispensing system by an operator. In particular, hoses are traditionally monochrome in color, with a vast majority of them being completely black. When a line is being setup, it is often difficult and time consuming for an operator to select the correct length of hose for each gun to ensure that each hose will have a sufficient length, without excessive slack, to reach its associated gun from the melter unit. The same problem occurs during maintenance and diagnostics when the ends of the hoses are disconnected from either the melter unit, the guns, or both. The operator must then determine which hoses are to be connected to the various guns of the system which can cause the system to operate improperly if the hoses are not reconnected in their proper positions.

In addition, care must be taken when selecting and connecting hoses between the melter unit and the guns since the temperature sensing devices within the hose and gun must be compatible with the controller of the system. For example, one particular temperature sensing device commonly used in the melter unit, hoses and guns is a resistance temperature detector (RTD) which may be made from different materials, such as nickel or platinum. A nickel RTD must be connected to a controller compatible with a nickel RTD, while a platinum RTD will only work properly with a controller compatible with a platinum RTD. If the RTD type of the hose and gun is not properly matched to the appropriate, material-specific controller, the controller may provide erroneous temperature information about the hot melt adhesive in the hose and gun and may cause the heating devices within these components to operate improperly.

A still further complication in proper setup and maintenance of the dispensing system is caused by the need for proper selection of a solenoid to control operation of solenoid-operated dispensing guns. For example, with pneumatic guns operated by pressurized air controlled through operation of a solenoid, such as the pneumatic dispensing gun fully disclosed in U.S. Pat. Nos. 4,066,188, 5,277,344 and 5,934,520, owned by the present assignee and the discloses of which is hereby incorporated herein by reference in their entirety, the solenoid is connected to a source of pressurized air to control actuation of a pneumatically-controlled valve within the gun. Each solenoid has a particular air volume capacity rating, voltage requirement and/or temperature rating which must be properly selected by the operator to meet the specific application needs. Improper selection of the solenoid may result in failure of the dispensing gun to provide the desired pattern of hot melt adhesive on the substrate. This can lead to significant downtime of the dispensing line.

For reasons such as those described above, it would be desirable to provide components of a liquid dispensing system that assist an operator in the proper selection of the components and in the configuration of those components in the system during setup, maintenance and diagnostics. It would also be desirable to assist an operator in the proper selection of a solenoid for use in a particular liquid dispensing application.

SUMMARY OF THE INVENTION

The present invention overcomes the foregoing and other shortcomings and drawbacks of manners of providing visual identification of the components of a liquid dispensing system heretofore known. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a liquid dispensing system is provided having visually identifiable color-coded indicia on components of the dispensing system to assist an operator in the proper selection of the components and in the configuration of those components in the system during setup, maintenance and diagnostics.

The liquid dispensing system includes a melter unit for holding a supply of hot melt adhesive and heated dispensers or guns for dispensing hot melt adhesive supplied from the melter unit. The melter unit includes a hot melt supply tank, heated manifold and pump. The hot melt adhesive, in a suitable molten condition, is supplied from the melter unit to the dispensing guns through heated hoses and is dispensed through dispensing orifices of the guns.

In accordance with one aspect of the present invention, each liquid outlet of the melter unit includes a unique visually identifiable color-coded indicia associated therewith. In one embodiment, the color-coded indicia may comprise color-coded rings, color-coded dots or color-coded numerals of different colors so that each liquid outlet has a unique visually identifiable color-coded indicia associated therewith. Any color-coded designation of the liquid outlets is contemplated by the present invention.

In accordance with another aspect of the present invention, each hose is provided with a unique visually identifiable color-coded indicia which corresponds to a connection location of the hose to one of the liquid outlets of the melter unit. The color-coded indicia may be located proximate one or both ends of the hose, although other locations are possible as well, so that each hose has a unique visually identifiable color-coded indicia associated therewith that matches in color with a color of one of the liquid outlets of the melter unit. In this way, the connection locations of the multiple hoses typically found in a liquid dispensing line to the liquid outlets of the melter unit can be readily identified by the operator by matching the color-coded indicia of the hoses with the color-coded indicia associated with the liquid outlets of the melter unit to assist the operator in proper setup of the dispensing system or during maintenance and diagnostics when the hoses must be reconnected with the melter unit after service or replacement.

The color-coded indicia on the hoses may comprise colored rings on the surface of the hose sheath of the hose or color-coded rings located within a groove formed in the hose sheath. Alternatively, the color-coded rings and grooves may be provided in the hose cuff or in the hose coupling. In another embodiment of the present invention, the color-coded ring on the hose sheath may be replaced with a color-coded ring member, such as a colored O-ring or metal retainer ring, which is releasably or permanently located within the groove formed in the hose sheath. Any color-coded designation of the hoses which corresponds to a connection location of the hose to one of the liquid outlets of the liquid outlet is contemplated by the present invention.

In accordance with yet another aspect of the present invention, each hose is provided with a visually identifiable color-coded indicia which corresponds to the length of the hose. In this way, the operator is able to easily and quickly select a hose length, or replace an existing hose, simply by referring to the color-coded indicia which corresponds to the hose length. The color-coded indicia may comprise a colored ring on the surface of the hose sheath or a color-coded ring located within a groove formed in the hose sheath. Alternatively, the groove may be provided in the hose cuff or in the hose coupling. In an alternative embodiment of the present invention, the color-coded ring is replaced with a color-coded ring member, such as a color O-ring or metal retainer ring, which is releasably or permanently located within the groove formed in the hose sheath similar in fashion to the ring member corresponding to the hose connection location on the melter unit. In another embodiment of the present invention, the color-coded indicia corresponding to the hose length may comprise a color-coded numeral. The numeral indicates the length of the hose, and the color of the numeral corresponds to the color-coded length of the hose. Any color-coded designation of the hoses which corresponds to the hose length is contemplated by the present invention.

In accordance with still yet another aspect of the present invention, a controller of the liquid dispensing system includes multiple electrical connections for electrically coupling electrical cordsets of the hoses with the controller. Each electrical connection of the controller includes a unique visually identifiable color-coded indicia associated therewith. The color-coded indicia may comprise colored rings or any other color-coded designation which is uniquely associated with each of the electrical connections of the controller.

In accordance with yet another aspect of the present invention, each hose and electrical cordset is provided with a visually identifiable color-coded indicia which corresponds to a connection location of the electrical cordset to one of the electrical connections of the controller. Each hose and cordset may be individually color-coded so that each hose and cordset has a unique visually identifiable color-coded indicia associated therewith that matches in color with a color of one of the electrical connections of the controller. In this way, the connection location of the multiple electrical cordsets typically found in a liquid dispensing line to the electrical connections of the controller can be readily identified by the operator by matching the color-coded indicia of the cordsets with the color-coded indicia associated with the electrical connections of the controller to assist in proper setup of the dispensing system or during maintenance and diagnostics when the cordsets must be reconnected with the controller after service or replacement.

In accordance with still yet another aspect of the present invention, each hose and electrical cordset may be provided with a visually identifiable color-coded indicia which corresponds to the temperature sensor, such as a resistance temperature device (RTD), used in the hoses and guns. In this way, an operator can readily determine the compatibility of the controller with the RTD's in the hoses and guns simply by looking at the color-coded indicia on the hoses and cordsets.

In accordance with still yet another aspect of the present invention, a solenoid of the liquid dispensing system is provided with visually identifiable color-coded indicia which corresponds to operating characteristics of the solenoid. In one embodiment of the present invention, the solenoid comprises a solenoid used with a pneumatic gun having color-coded indicia which corresponds to an air volume rating of the solenoid and another different color-coded indicia corresponding to a voltage requirement and/or temperature rating of the solenoid for a particular application. In this way, the color-coded indicia assists an operator in the proper selection of a solenoid for use in the liquid dispensing system based on its operating characteristics. The color-coded indicia may be used with other types of liquid dispensing guns, including electric guns, so that the color-coded indicia corresponds to operating characteristics of the solenoid used with a particular type of liquid dispensing gun.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 2 is an enlarged side elevational view of a hose used in the liquid dispensing system of FIG. 1, illustrating one end of the hose in accordance with one aspect of the present invention;

FIG. 2A is a view similar to FIG. 2, illustrating the hose end of FIG. 2 in accordance with a second aspect of the present invention;

FIG. 2B is a view similar to FIG. 2, illustrating the hose end of FIG. 2 in accordance with a third aspect of the present invention;

FIG. 2C is a view similar to FIG. 2, illustrating the hose end of FIG. 2 in accordance with a fourth aspect of the present invention;

FIG. 2D is a view similar to FIG. 2, illustrating the hose end of FIG. 2 in accordance with a fifth aspect of the present invention.

DETAILED DESCRIPTION OF SPECIFIC EMBODIMENTS

Figure 1:
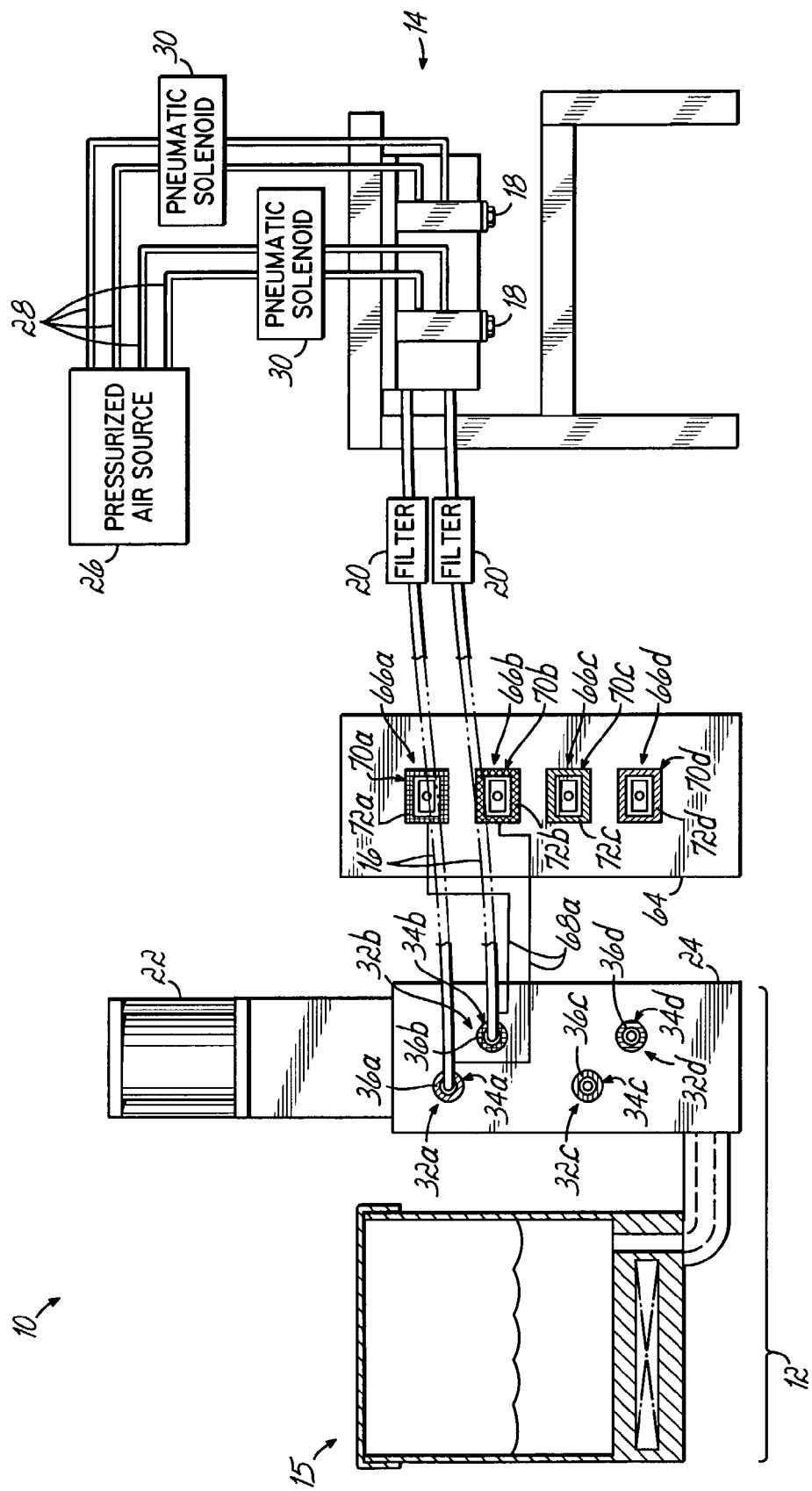
FIG. 1 is a schematic view of an exemplary liquid dispensing system including color-coded visually identifiable indicia in accordance with the principles of the present invention.

Referring now to FIG. 1, an exemplary liquid dispensing system 10, such as a hot melt adhesive dispensing system, is shown incorporating the principles of the present invention. Dispensing system 10 includes a melter unit 12 for holding a supply of hot melt adhesive and heated dispensers or guns 14 (two (2) shown) for dispensing hot melt adhesive supplied from the melter unit 12. The melter unit 12 includes a hot melt supply tank 15 so that hot melt adhesive, in a suitable molten condition, is supplied to the dispensing guns 14 from the tank through heated hoses 16 and is dispensed through dispensing orifices 18 of the guns 14. The hot melt adhesive is supplied from the melter unit 12 to the hoses 16 and through filters 20 to the dispensing guns 14 under the influence of a pump 22 and pump manifold 24 of the melter unit 12. While the present invention will be described in connection with dispensing of hot melt adhesives, those of ordinary skill in the art will appreciate that the present invention is applicable to a wide variety of liquid dispensing systems without departing from the spirit and scope of the present invention.

In one embodiment of the present invention, the dispensing guns 14 may be pneumatically-controlled guns such as those fully described in U.S. Pat. Nos. 4,066,188, 5,277,344 and 5,934,520 previously incorporated herein by reference to which the reader is referred. Briefly, each pneumatically-controlled gun 14 has an internal valve (not shown) which moves relative to a valve seat (not shown) of the dispensing orifice 18 in response to pressurized air supplied from a pressurized air source 26. The valve (not shown) of each gun 14 is positioned in a valve chamber (not shown) within the gun 14 and includes a diaphragm (not shown) that defines an upper air chamber (not shown) above the diaphragm (not shown) and a lower air chamber (not shown) below the diaphragm (not shown). Pressurized air is connected from the pressurized air source 26 to the upper and lower air chambers (not shown) through a pair of air conduits 28 connected to each gun 14. A solenoid 30, well known to those skilled in the art, is provided in the fluid path between the pressurized air source 26 and each gun 14 to control the passage of pressurized air to the upper and lower air chambers (not shown) within each gun 14.

When pressurized air is permitted to pass from the pressurized air source 26 to the lower air chamber (not shown) of the gun 14, the pressurized air forces the diaphragm (not shown) and its associated valve (not shown) away from valve seat (not shown) of the dispensing orifice 18 to permit dispensing of hot melt adhesive from the dispensing orifice 18 of the gun 14. The valve (not shown) is seated relative to the valve seat (not shown) of the dispensing orifice 18 when the solenoid 30 permits pressurized air to pass from the pressurized air source 26 to the upper air chamber (not shown) of the gun 14 which forces the diaphragm (not shown) and its associated valve (not shown) toward the dispensing orifice 18 so that the valve (not shown) seats on the valve seat (not shown) to close the dispensing orifice 18. A spring (not shown) may be provided to assist in the closing action of the valve (not shown). While pneumatically-controlled dispensing guns 14 are described herein, other types of liquid dispensing guns, including electric guns, are possible as well without departing from the spirit and scope of the present invention.

In accordance with one aspect of the present invention as shown in FIG. 1, each liquid outlet 32a–d of the melter unit 12 includes a visually identifiable color-coded indicia 34a–d associated with each liquid outlet 32a–d. The color-coded indicia 34a–d are shown colored, such as by paint, as colored rings 36a–d that encircle each respective liquid outlet 32a–d. Each color-coded ring 36a–d is painted a different color to provide separate visually identifiable indications of the different liquid outlets 32a–d. For example, liquid outlets 32a–d may be individually color-coded green, yellow, blue and red, respectively, so that each of the liquid outlets 32a–d has a unique visually identifiable color-coded indicia associated therewith. Any color-coded designation of the liquid outlets 32a–d is contemplated by the present invention. For example, the color-coded rings 36a–d may be replaced with color-coded dots (not shown) or numerals (not shown) such as colored numerals "1", "2", "3" and "4" of different colors so that each liquid outlet 32a–d has a unique visually identifiable color-coded indicia associated therewith. Alternatively, the color-coded rings 36a–d may comprise color-coded snap-in ring members (not shown) of different colors that are releasably or permanently attached to the melter unit 12 to encircle each liquid outlet 32a–d to provide a unique visually identifiable color-coded indicia associated with each liquid outlet 32a–d. In yet another alternative embodiment, it is contemplated that each coupling of the liquid outlets 32a–d may be color-coded, such as by paint, in accordance with the principles of the present invention.

In accordance with another aspect of the present invention, as shown in FIG. 2, each hose 16 is provided with a unique visually identifiable color-coded indicia 38 which corresponds to a connection location of the hose 16 to one of the liquid outlets 32a–d. The color-coded indicia 38 may be located proximate one or both ends of the hose 16, although other locations are possible as well. For example, each hose 16 may be color-coded with different colors such as green, yellow, blue and red so that each hose 16 has a unique visually identifiable color coded-indicia 38 associated therewith that matches in color with the color-coded indicia 34 of the liquid outlets 32a–d of the melter unit 12. The green color-coded indicia 38 indicated by the cross-hatching in FIG. 2 indicates to an operator that the hose 16 is intended to connect with the green liquid outlet 32a of the melter unit 12. In this way, the connection location of the multiple hoses 16 typically found in a liquid dispensing line to the liquid outlets 32a–d of the melter unit 12 can be readily identified by the operator to assist the operator in proper setup of the dispensing system or during maintenance and diagnostics when the hoses 16 must be reconnected with the melter unit 12 after service or replacement.

Figure 3:
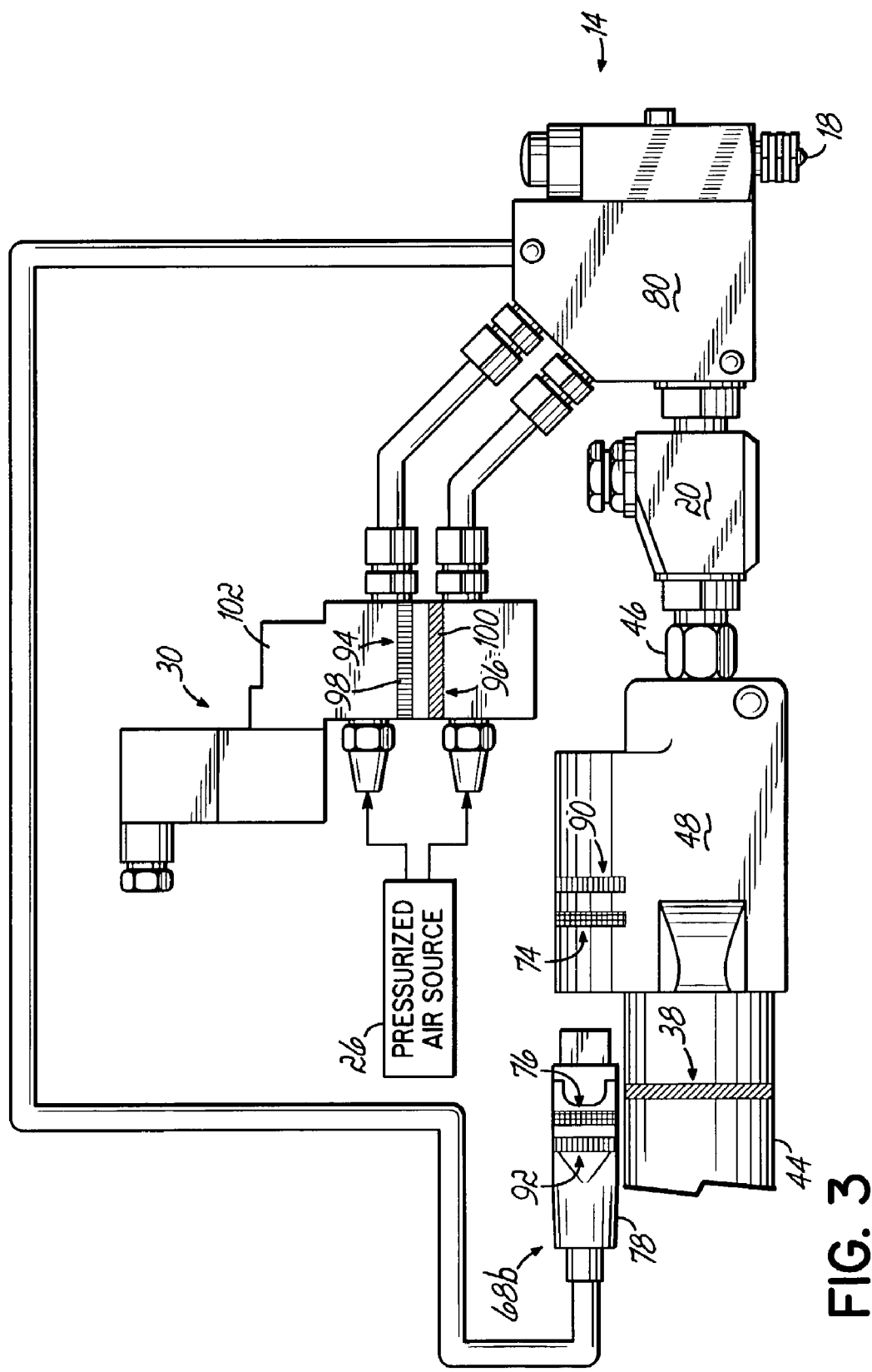
FIG. 3 is a view similar to FIG. 2, illustrating an opposite end of the hose to that hose end illustrated in FIG. 2.

The operator is further assisted in the proper connection of the hoses 16 to the liquid dispensers 14 by providing a separate visually identifiable color-coded indicia, also designated by numeral 38, proximate the dispenser side of the hose 16 as shown in FIG. 3, although other locations are possible as well. The color-coded indicia 38 shown in FIG. 3 matches in color with the color-coded indicia 38 located proximate the melter unit side of the hose 16. In this way, the operator is able to easily identify, through the color-coded indicia 38 at the dispenser side of the hose 16, which dispensing gun 14 the hose 38 should be connected to.

The color-coded indicia 38 which corresponds to the intended connection location of the hose 16 to one of the liquid outlets 32a–d of the melter unit 12 is shown colored in FIG. 2, such as by paint, as a colored ring 40 on the surface of the hose sheath 44 and that encircles the body of the hose 16. It will be understood that the hose body includes the various components of the hose 16, including the hose sheath 44, the hose couplings 46 located at opposite ends of the hose 16 and the hose cuffs 48 which may be located at one or both ends of the hose 16. Any color-coded designation of the hoses 16 which corresponds to a connection location of the hose 16 to one of the liquid outlets 32a–d is contemplated by the present invention.

For example, as shown in an alternative embodiment of FIG. 2A, the color-coded ring 40 on the hose sheath 44 of FIG. 2 is shown as color-coded ring 40a located within a groove 50 formed in the hose sheath 44a proximate one or both ends of the hose 16a. Alternatively, it will be appreciated that the groove 50 may be provided in the hose cuff 48a or in the hose coupling 46a. Locating the color-coded ring 40a within the groove 50 reduces the likelihood that the ring 40a will be worn away during the life of the hose 16.

As shown in the alternative embodiment of FIG. 2B, the color-coded ring 40 on the hose sheath 44 of FIG. 2 is shown as a color-coded ring member 52, such as a colored O-ring or metal retainer ring, which is releasably or permanently located within a groove 50b formed in the hose sheath 44b proximate one or both ends of the hose 16b. In this way, the ring member 52 can be readily changed with a ring member of a different color when the connection location of the hose 16b to one of the liquid outlets 32a–d is to be changed. Those skilled in the art will appreciate the many configurations of color-coded indicia 38 that are possible to provide a visually identifiable color-coded indication of the intended connection location of the hose 16 with the liquid outlets 32a–d in accordance with the principles of the present invention.

In accordance with another aspect of the present invention, as show in FIG. 2, each hose 16 is provided with a visually identifiable color-coded indicia 54 which corresponds to the length of the hose 16. The color-coded indicia 54 may be located proximate one or both ends of the hose 16 (one shown), although other locations are possible as well. For example, each hose 16 may be color-coded yellow for a four (4) foot length, pink for a six (6) foot length, blue for an eight (8) foot length, white for a ten (10) foot length, brown for a twelve (12) foot length and so on so that each hose 16 has a unique visually identifiable color-coded indicia 54 which corresponds to the predetermined length of the hose 16. In this way, the operator is able to easily and quickly select a hose length, or to replace an existing hose 16, simply by referring to the color-coded indicia 54 which corresponds to the hose length. The operator would not even have to know that a blue color-coded indicia 54, as indicated by the cross-hatchings in FIG. 2, corresponds to a eight (8) foot hose, but may simply refer to a hose 16 that has a blue hose length indicia 54 and this will precisely identify the correct hose length for a new or replacement hose 16.

The color-coded indicia 54 which corresponds to the hose length is shown colored in FIG. 2, such as by paint, as a colored ring 56 on the surface of the hose sheath 44 and encircles the hose body in similar fashion to the colored ring 40 corresponding to the hose connection location on the melter unit 12. Any color-coded designation of the hose length is contemplated by the present invention.

For example, as shown in the alternative embodiment of FIG. 2A, the color-coded ring 56 on the hose sheath 44 of FIG. 2 is shown as a color-coded ring 56 located within a groove 58 formed in the hose sheath 44a in similar fashion to the color-coded ring 40 corresponding to the hose connection location on the melter unit 12. Alternatively, the groove 58 may be provided in the hose cuff 48a or in the hose coupling 46a without departing from the spirit or scope of the present invention.

As shown in the alternative embodiment of FIG. 2B, the color-coded ring 56 on the hose sheath 44 of FIG. 2 is shown as a color-coded ring member 60, such as a colored O-ring or metal retainer ring, which is releasably or permanently located within a groove 58b formed in the hose sheath 44b similar in fashion to the ring member 52 corresponding to the hose connection location on the melter unit 12.

FIG. 2C illustrates another alternative embodiment wherein the color-coded indicia 54 corresponding to the hose length is shown as a color-coded numeral 62, such as a blue numeral "8" by way of illustration, located on the hose sheath 44c. Specifically, in this embodiment, the numeral "8" indicates the length of the hose, and the blue color of the numeral corresponds to color-coded length of the hose 16. In this way, an operator may simply refer to the length of the hose 16 as represented by the numeral, such as "8", or, alternatively, the color of the hose 16 as represented by the color of the numeral, such as "blue", and the correct length of hose 16 will be identified during selection of a new hose 16 or replacement of an old hose 16. As with the other color-coded indicia of the present invention described in detail above, those skilled in the art will appreciate the many configurations of color-coded indicia 54 that are possible to provide a visually identifiable color-coded indication of the length of the hose 16 in accordance with the principles of the present invention.

In accordance with yet another aspect of the present invention, as shown in FIG. 1, a controller 64 of the liquid dispensing system has multiple electrical connections 66a–d for electrically coupling an electrical cordset 68a associated with the hose 16 (see FIG. 2) with the controller 64. Each electrical connection 66a–d of the controller 64 includes a visually identifiable color-coded indicia 70a–d associated with each electrical connection 66a–d. The color-coded indicia 70a–d are shown colored, such as by paint, as colored rings 72a–d that encircle each respective electrical connection 66a–d. As with the color-coded rings 36a–d on the pump manifold 24, each color-coded ring 72a–d is painted a different color to provide separate visually identifiable indications of the different electrical connections 66a–d. For example, electrical connections 66a–d may be individually color-coded yellow, orange, brown and green, respectively, so that each of the electrical connections 66a–d has a unique visually identifiable color-coded indicia associated therewith. Any color-coded designation of the electrical outlets 66a–d is contemplated by the present invention as described in detail above in connection with the color-coded rings 36a–d of the pump manifold 24.

In accordance with yet another aspect of the present invention, as shown in FIG. 2, each hose 16 and electrical cordset 68a is provided with a visually identifiable color-coded indicia 74 and 76, respectively, which corresponds to a connection location of the electrical cordset 68a to one of the electrical connections 66a–d of the controller 64. The color-coded indicia 74 and 76 may be located proximate one or both ends of the hose 16 and on one or both connectors 78 of the electrical cordset 68a, although other locations are possible as well. For example, each hose 16 and cordset 68a may be individually color-coded yellow, brown, orange and green so that each hose 16 and cordset 68a has a unique visually identifiable color coded-indicia 74 and 76, respectively, associated therewith that matches in color with one of the electrical connections 66 and of the controller 64. The yellow color-coded indicia 74 and 76 on the hose 16 and cordset 68a indicated by the cross-hatching in FIG. 2 indicates to an operator that the cordset 68a is intended to connect with the yellow electrical connection 66a of the controller 64. In this way, the connection location of the multiple electrical cordsets 68a typically found in a liquid dispensing line to the electrical connections 66a–d of the controller 64 can be readily identified by the operator to assist in proper setup of the dispensing system or during maintenance and diagnostics when the cordsets 66a must be reconnected with the controller 64 after service or replacement.

As shown in FIG. 3, the operator is further assisted in the proper connection of the electrical cordsets 68b to the manifold 80 of liquid dispensers 14 by providing a separate visually identifiable color-coded indicia, also designated by numerals 74 and 76, proximate the dispenser side of the hose 16 and on the connector 78 of the cordset 68b. The color-coded indicia 74 and 76 shown in FIG. 3 matches in color with the color-coded indicia 74 and 76 located proximate the melter unit side of the hose 16 and on the connector 78 of the electrical cordset 68b, respectively. In this way, the operator is able to easily identify, through the color-coded indicia 74 and 76 at the dispenser side of the hose 16 and on the electrical cordset 68b, which dispensing gun 14 the cordset 68b should be connected to.

The color-coded indicia 74 and 76 which correspond to the intended connection location of the electrical cordset 68a to the electrical connections 66a–d of the controller 64 is shown colored in FIGS. 2 and 2A–2C, such as by paint, as a colored band 82 on the surface of the hose cuff 48 and as a colored ring 84 that encircles the connector 78 of the electrical cordset 68a. Any color-coded designation of the hoses 16 and electrical cordsets 68a and 68b which corresponds to a connection location of the cordset 68a to one of the electrical connections 66a–d of the controller 64 is contemplated by the present invention. For example, the colored band 82 on the hose cuff 48 and the colored ring 84 on the connector 78 may be provided in grooves (not shown) formed in these components.

In an alternative embodiment as shown in FIG. 2D, the color-coded band 82 on the hose cuff 48 of FIG. 2 is replaced with a color-coded snap-in band member 86 which is releasably or permanently received in a groove 88 formed in the hose cuff 48. In this way, the band member 86 can be readily changed with a band member of a different color when the connection location of the cordset 68a to the electrical connections 66a–d of the controller 64 is to be changed. Those skilled in the art will appreciate the many configurations of color-coded indicia 74 and 76 that are possible to provide a visually identifiable color-coded indication of the intended connection location of the cordset 68a with the electrical connections 66a–d of the controller 64 in accordance with the principles of the present invention.

As is well known in the art, each dispensing gun 14 and hose 16 includes a separate heater which must be within a predetermined temperature range to provide the proper viscosity for the particular hot melt adhesive used in the dispensing application. To monitor the temperature of the hot melt adhesive throughout the dispensing system 10, each hose 16 and dispensing gun 14 includes a temperature sensor (not shown), such as a nickel or platinum resistance temperature device (RTD), which is electrically coupled to the controller 64 through the electrical cordset 68a attached to the melter unit side of the hose 16 and by the cordset 68b attached to each gun 14. The controller 64 senses the temperature within the dispensing guns 14 and hoses 16 through the respective RTD's (not shown) and operates the heaters (not shown) within the hoses 16 and dispensing guns 14 to maintain the hot melt adhesive within the predetermined temperature range.

As described in detail above, if the RTD type of the hoses 16 and guns 14 are not properly matched to the appropriate, material-specific controller 64, the controller 64 will provide erroneous temperature information about the hot melt adhesive in the hoses 16 and guns 14 and may cause the heating devices within these components to operate improperly.

In accordance with still another embodiment of the present invention, each hose 16 and electrical cordset 68a and 68b may be provided with a visually identifiable color-coded indicia 90 and 92, respectively, which corresponds to the RTD type used in the hoses 16 and guns 14. The color-coded indicia 90 and 92 may be located proximate one or both sides of the hose 16 and on one or both connectors 78 of each cordset 68a and 68b, although other locations are possible as well. One color may indicate a nickel RTD in the hoses 16 and guns 14 while another color may represent a platinum RTD in the hoses 16 and guns 14. In this way, an operator can readily determine the compatibility of the controller 64 with the RTD's in the hoses 16 and guns 14 simply by looking at the color-coded indicia 90 and 92 on the hoses 16 and cordsets 68a and 68b. Those skilled in the art will appreciate the many configurations of color-coded indicia 90 and 92 on the hoses 16 and cordsets 68a, 68b that are possible to provide a visually identifiable color-coded indication of the RTD type within the hoses 16 and guns 14 in accordance with the principles of the present invention.

As shown in FIG. 3, and in accordance with yet another aspect of the present invention, the solenoid 30, which may be a solenoid used to control pressurized air that operates a pneumatic gun for example, is provided with visually identifiable color-coded indicia 94 and 96 which correspond to operating characteristics of the solenoid 30. For example, color-coded indicia 94 may correspond to an air volume rating of the solenoid while color-coded indicia 96 may correspond to another operating characteristic of the solenoid such as its voltage requirement and/or its temperature rating. For example, the color-coded indicia 96 may designate the solenoid 30 as a 12V or 24V solenoid. Alternatively, the color-coded indicia 96 may represent both the voltage requirement of the solenoid 30 and its temperature rating, such as a 12V or 24V solenoid having either a "low" or "high" temperature rating. Of course, other color-coded designations of the operating characteristics of the solenoid 30 are possible as well. Color-coded indicia 94 and 96 are shown colored in FIG. 3, such as by paint, as colored bands 98 and 100, respectively, on the surface of the solenoid 30. Any color-coded designation of an operating characteristic of the solenoid 30 is contemplated by the present invention which may be provided on the surface of the solenoid or on the surface of a liquid dispensing gun housing the solenoid, such as with an electric gun. Preferably, where more than one color-coded indicia is used, the color-coded indica 96 chosen to correspond to one operating characteristic of the solenoid 30 should be different in color than the color-coded indicia chosen to correspond to another operating characteristic of the solenoid. In this way, the color-coded indicia 94 and 96 assist an operator in the proper selection of a solenoid based on its operating characteristics.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A hot melt adhesive hose for use in transferring hot melt adhesive from a liquid supply source, comprising:
    an elongated hose body configured to transfer hot melt adhesive; and
    a visually identifiable color-coded indicia associated with said hose body and corresponding to at least one of a length and an electrical characteristic of said hose body.

2. The hose of claim 1 wherein said visually identifiable indicia is located proximate one end of said hose body.

3. The hose of claim 1 wherein said visually identifiable indicia is located proximate respective opposite ends of said hose body.

4. The hose of claim 1 wherein said visually identifiable indicia is a color-coded ring encircling said hose body.

5. The hose of claim 4 wherein said color-coded ring comprises a colored marking encircling said hose body.

6. The hose of claim 4 further comprising:
    a groove formed in said hose body; and
    said color-coded ring comprises a colored marking located within said groove.

7. The hose of claim 4 further comprising:
    a groove formed in said hose body; and
    said color-coded ring comprises a colored ring member secured within said groove.

8. The hose of claim 1 wherein said visually identifiable indicia is a colored character.

9. The hose of claim 1 for use in a liquid dispensing system to convey liquid from the liquid supply source to a dispensing gun, the liquid dispensing system further having a controller including a plurality of electrical connections each having a different visually identifiable color-coded indicia associated therewith, the hose further comprising:
    a pair of electrical connections each located proximate respective opposite ends of said hose body, said hose body being capable of fluidly connecting the liquid supply source to the dispensing gun;
    a first electrical cordset adapted to couple one of said electrical connections of said hose body with the controller;
    a second electrical cordset adapted to couple the other of said electrical connections of said hose body with the dispensing gun; and
    a second visually identifiable color-coded indicia associated with said hose body and at least one of said first and second electrical cordsets and corresponding to a connection location of said first electrical cordset to one of the plurality of electrical connections of the controller.

10. The hose of claim 9 further comprising a third visually identifiable color-coded indicia associated with at least one of said first and second electrical cordsets and corresponding to an electrical characteristic of at least one of said hose body and the dispensing gun.

11. The hose of claim 9 further comprising a hose cuff located proximate at least one end of said hose body, said second visually identifiable indicia being associated with said hose cuff.

12. The hose of claim 11 wherein said second visually identifiable indicia is a color-coded band located on said hose cuff.

13. The hose of claim 12 wherein said color-coded band comprises a colored marking on said hose cuff.

14. The hose of claim 12 further comprising:
    a groove formed in said hose body; and
    said color-coded ring comprises a colored marking located within said groove.

15. The hose of claim 12 further comprising:
    a groove formed in said hose body; and
    said color-coded ring comprises a colored band member located within said groove.

16. The hose of claim 1, wherein said electrical characteristic corresponds to a temperature sensor associated with said hose body.

17. The hose of claim 16, wherein said temperature sensor is a resistance temperature device (RTD), and wherein said electrical characteristic is a resistance temperature device type.

18. A hot melt adhesive hose for use in transferring hot melt adhesive from a liquid supply source, comprising:
    an elongated hose body configured to transfer hot melt adhesive; and
    a first visually identifiable color-coded indicia associated with said hose body and corresponding to a characteristic of a device to which said hose body is adapted to connect; and
    a second visually identifiable color-coded indicia associated with said hose body and corresponding to a characteristic of said hose body.

19. The hose of claim 18 wherein said first visually identifiable indicia corresponds to a connection location of said hose body to the device.

20. The hose of claim 18 wherein said second visually identifiable indicia corresponds to at least one of a length and an electrical characteristic of said hose body.

21. The hose of claim 18 wherein said first and second visually identifiable indicia are located proximate one end of said hose body.

22. The hose of claim 18 wherein said first and second visually identifiable indicia are located proximate one end of said hose body and at least one of said first and second visually identifiable indicia is further located proximate an opposite end of said hose body.

23. The hose of claim 18 wherein at least one of said first and second visually identifiable indicia is a color-coded ring encircling said hose body.

24. The hose of claim 23 wherein said color-coded ring comprises a colored marking encircling said hose body.

25. The hose of claim 23 further comprising:
    at least one groove formed in said hose body; and
    said color-coded ring comprises a colored marking located within said groove.

26. The hose of claim 23 further comprising:
    at least onea groove formed in said hose body; and
    said color-coded ring comprises a colored ring member secured within said groove.

27. The hose of claim 18 wherein at least one of said first and second visually identifiable indicia is a colored character.

28. The hose of claim 20, wherein said electrical characteristic is a resistance temperature device (RTD) type associated with said hose body.

29. Dispensing apparatus for dispensing liquid materials, comprising:
- a liquid supply source including a plurality of liquid outputs;
- a dispensing gun having a valve movable relative to a dispensing orifice of said gun;
- an elongated hose body fluidly connecting said liquid supply source to said dispensing gun; and
- a first visually identifiable color-coded indicia associated with said hose body and corresponding to at least one of a length of said hose body, an electrical characteristic of said hose body and a connection location of said hose body to one of the plurality of liquid outputs of the liquid supply source.

30. The dispensing apparatus of claim 29 further comprising:
- a second visually identifiable color-coded indicia associated said plurality of liquid outputs of said liquid supply source.

31. The dispensing apparatus of claim 28 further comprising:
- a controller including a plurality of electrical connections each having a different visually identifiable color-coded indicia associated therewith;
- a pair of electrical connections located proximate respective opposite ends of said hose body;
- a first electrical cordset coupling one of said electrical connections of said hose body with said controller;
- a second electrical cordset coupling the other of said electrical connections of said hose body with said dispensing gun; and
- a second visually identifiable color-coded indicia associated with said hose body and at least one of said first and second electrical cordsets and corresponding to a connection location of said first electrical cordset to one of the plurality of electrical connections of said controller.

32. The dispensing apparatus of claim 31 further comprising a third visually identifiable color-coded indicia associated with said hose body and at least one of said first and second electrical cordsets and corresponding to an electrical characteristic of at least one of said hose body and said dispensing gun.

33. The dispensing apparatus of claim 28 further comprising:
- a solenoid operable to control movement of said valve; and
- a visually identifiable color-coded indicia associated with said solenoid and corresponding to an operating characteristic of said solenoid.

34. The solenoid of claim 33 wherein said visually identifiable color-coded indicia associated with said solenoid comprises:
- a first visually identifiable color-coded indicia corresponding to an air volume capacity of said solenoid.

35. The solenoid of claim 34 wherein said visually identifiable color-coded indicia associated with said solenoid further comprises:
- a second visually identifiable color-coded indicia corresponding to an electrical characteristic of said solenoid.

36. A hose for use in transferring fluid, comprising:
- an elongated hose body capable of transferring fluid; and
- a visually identifiable color-coded indicia associated with said hose body and corresponding to at least one of a length and an electrical characteristic of said hose body.

37. The hose of claim 36 wherein said visually identifiable indicia is located proximate one end of said hose body.

38. The hose of claim 36 wherein said color-coded ring comprises a colored marking encircling said hose body.

39. A hose for use in transferring fluid, comprising:
- an elongated hose body capable of transferring fluid;
- a first visually identifiable color-coded indicia associated with said hose body and corresponding to a connection location of said hose body to a device to which said hose body is adapted to connect; and
- a second visually identifiable color-coded indicia associated with said hose body and corresponding to a characteristic of said hose body.

40. The hose of claim 39 wherein said second visually identifiable indicia corresponds to at least one of a length and an electrical characteristic of said hose body.

41. The hose of claim 39 wherein said first and second visually identifiable indicia are located proximate one end of said hose body.

42. The hose of claim 39 wherein at least one of said first and second visually identifiable indicia is a color-coded ring encircling said hose body.

43. The hose of claim 42 wherein said color-coded ring comprises a colored marking encircling said hose body.

44. The dispensing apparatus of claim 29, wherein said electrical characteristic corresponds to a temperature sensor associated with said hose body.

45. The hose of claim 44, wherein said temperature sensor is a resistance temperature device (RTD), and wherein said electrical characteristic is a resistance temperature device type.

46. The hose of claim 36, wherein said electrical characteristic is a resistance temperature device (RTD) type associated with said hose body.

47. The hose of claim 40, wherein said electrical characteristic is a resistance temperature device (RTD) type associated with said hose body.

* * * * *

UNITED STATES PATENT AND TRADEMARK OFFICE
CERTIFICATE OF CORRECTION

PATENT NO.           : 7,216,777 B2  
APPLICATION NO. : 10/285200  
DATED                    : May 15, 2007  
INVENTOR(S)         : John M. Raterman et al.

It is certified that error appears in the above-identified patent and that said Letters Patent is hereby corrected as shown below:

Column 1
Line 49, reads "...while other guns maybe located at..." and should read -- ...while other guns may be located at... --.

Column 2
Line 25, reads ""...discloses of which is hereby incorporated..." and should read -- ...disclosures of which are hereby incorporated... --.

Column 6
Line 59, reads "...identifiable color coded-indicia 38..." and should read -- ...identifiable color-coded indicia 38... --.

Column 9
Line 15, reads "...identifiable color-coded indicia 74..." and should read -- ...identifiable color-coded indicia 74... --.

Column 12
Line 65, claim 26, reads "...at least onea groove formed in said..." and should read -- at least one groove formed in said... --.

Column 13
Line 24, claim 30, reads "...associated said plurality of..." and should read -- associated with said plurality of... --.

Line 26, claim 31, reads "apparatus of claim 28 further comprising..." and should read -- apparatus of claim 29 further comprising --.

Signed and Sealed this

Eighth Day of April, 2008

JON W. DUDAS  
*Director of the United States Patent and Trademark Office*